United States Patent [19]

Mörschel et al.

[11] Patent Number: 4,899,433
[45] Date of Patent: Feb. 13, 1990

[54] METHOD AND DEVICE FOR LAMINATION PICKUP FROM A STACK

[75] Inventors: Richard Mörschel, Nidderau; Hagen Ludwig, Maintal, both of Fed. Rep. of Germany

[73] Assignee: Statomat-Globe Maschinenfabrik GmbH, Niederdorfelden, Fed. Rep. of Germany

[21] Appl. No.: 254,214

[22] Filed: Oct. 6, 1988

[30] Foreign Application Priority Data

Oct. 7, 1987 [DE] Fed. Rep. of Germany ....... 3733813
Oct. 23, 1987 [DE] Fed. Rep. of Germany ....... 3735870

[51] Int. Cl.$^4$ ............................................ H02K 15/02
[52] U.S. Cl. ......................................... 29/596; 29/598; 29/738; 414/796; 414/796.4
[58] Field of Search ................. 29/598, 732, 736, 738, 29/609, 596; 414/796, 796.4, 27, 907

[56] References Cited

U.S. PATENT DOCUMENTS 4,079,512 3/1978 Lakes ..................................... 29/738
4,311,424 1/1982 Schwab et al. ....................... 29/738
4,383,356 5/1983 Fichtner ................................ 29/738

Primary Examiner—P. W. Echols
Attorney, Agent, or Firm—Albert L. Jeffers; Anthony Niewyk

[57] ABSTRACT

The method and apparatus for pickup of packets with a varying number of stamped laminations, for instance for stators of electrical machines, from a lamination stack (98) compressed under tension between clamping plates (24, 100) is so performed that the first packet half of laminations are always rotated by 180° before the entire lamination packet is measured off and picked up. Therefore, two different stops (42, 44) are needed for measuring off the first half and then the entire lamination packet for each packet height. In order to dispense with the necessity of having to exchange, when changing the packet height, the one clamping plate which heretofore was designed with various stops, the lamination packets with a differing number of laminations are always mounted between the same clamping plates (24, 100) and supported together with the one clamping plate (24) on axially adjustable stops (42, 44). Consequently, the device features axially adjustable stop (42, 44).

15 Claims, 4 Drawing Sheets

METHOD AND DEVICE FOR LAMINATION PICKUP FROM A STACK

BACKGROUND OF THE INVENTION

This invention relates to a method and apparatus for picking up laminations from a stack, for instance, laminations for use in manufacturing stators or rotors of a dynamo electrical machine. More particularly, the invention relates to a method and apparatus for packeting stator and rotor laminations for electric motors.

In addition to methods for the pressureless packeting of laminations according to, e.g., the German patent disclosures 29 49 230 and 31 47 034, whereby a specific number of laminations is picked up only under the dead weight of the stack, it has previously been known, for instance from the German patent disclosures 20 19 924 and 29 07 261, to mount a stack of laminations between clamping plates, in order to achieve greater accuracy of the packet height, and to mark off a specific packet height by means of a blade which, with reference to one of the clamping plates, is run sideways against the stack at a specific point. To avoid variations resulting from laminations which are not uniformly thick across their circumference, it is already known in the prior art to first pick up laminations of one-half packet height, rotate this half lamination packet by 180°, recombine it with the stack and only then to pick up the entire lamination packet. The clamping plate of the prior art design, which together with the blade delimits the lamination packet to be picked up from the stack, is provided for that purpose on its backside, with two different stop faces which correspond to the respective half and whole packet heights and which in the two angular positions of the clamping plate which are offset by 180°, are rotated together with the first packet half, individually make contact with a specific support surface of the packeting head which picks up the lamination packet and moves the packet away from the stack.

The packeting performed with this prior art device has the disadvantage that even with a minimal adjustment of the spacing of the clamping surface of one clamping plate relative to the blade, which may become necessary during the manufacture of a packet series of a specific height, due to the added thickness variations of the processed laminations, production must be interrupted for correcting the splitting plane of the blade. Such an interruption of production has so far been necessary also when changing over from one packet height to another for exchange of the clamping plate. Besides the time lost and the necessity of operating with a number of clamping plates with different stop faces, the further consequence resulted heretofore that in the simultaneous manufacture of several different packet heights several packeting devices also needed to be linked with an insulating device for inserting long insulation strips of different lengths in the stator or rotor slots, although the insulating devices have, in the case of a large number of slots, a much longer cycle time than the packeting devices. Therefore, the problem underlying the invention is to improve the prior packeting method and the device for its application so that adjustments and changes of packet height can be made without or with only very short interruptions of production. The above problem is solved by the method and apparatus according to the present invention as disclosed and claimed hereinafter.

SUMMARY OF THE INVENTION

The present invention, in one form thereof, comprises a method for picking up packets with a varying number of stamped laminations, for instance, laminations for stators or rotors of an electrical motor, from a lamination stack. The lamination stack is compressed between two clamping plates. The method comprises splitting the first half of a packet of laminations in a first partition plane determined by a first axial stop of the one clamping plate and the axial position of a blade which can be forced against the stack from one side. The first half of the packet of laminations to be picked up is rotated by 180° and the first half of the packet of laminations is then reunited with the stack, whereafter the entire lamination packet is split in a second partition plane determined by a second axial stop of the one clamping plate and the axial position of the blade. Packets with a varying number of laminations are mounted between the same clamping plates and are supported in mounted position along with the one clamping plate on axially adjustable stops.

The present invention, in one form thereof, comprises a device for picking up packets of stator or rotor laminations. The device comprises a pair of clamping plates which are movable relative to each other and serve to compress a stack of laminations. A blade is provided which can be forced against one side of the stack. The front of the clamping plates is rotatable through 180° with the first half of the laminations of a packet and is axially supportable in both angular positions by different axially adjustable stops.

The invention offers the advantage that the laminations, independent of packet height variations are always compressed between the same clamping plates, that production consequently continues at the given rate with only minimal delays, so that also one single packeting device needs to be provided to be linked, e.g., with two insulating devices for different packet heights.

BRIEF DESCRIPTION OF THE DRAWINGS

An embodiment of the invention will be more fully explained hereafter with the aid of the accompanying drawings, wherein.

The exemplifications set out herein illustrate a preferred embodiment of the invention, in one form thereof, and such exemplifications are not to be construed as limiting the scope of the disclosure or the scope of the invention in any manner.

DETAILED DESCRIPTION OF THE PREFERRED EMBODIMENT

Figure 2:
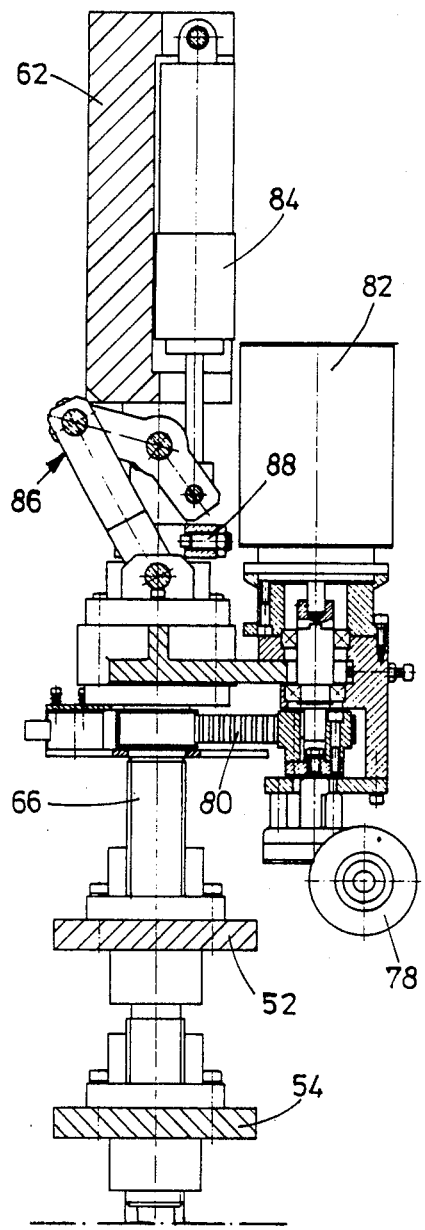
FIG. 2 is a vertical section offset by 90°, of the upper part of the adjustment device according to FIG. 1A.
Figure 1A:
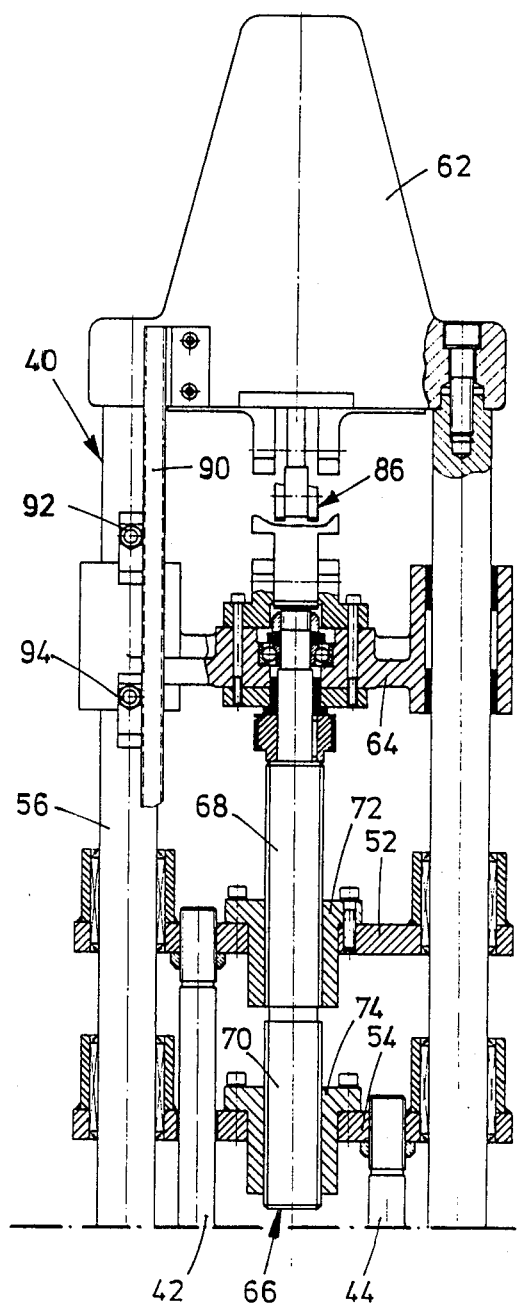
FIG. 1A and 1B show a vertical section of the upper part and the adjoining lower part of the adjustment device for stops interacting with a clamping plate of a packeting device.
Figure 1B:
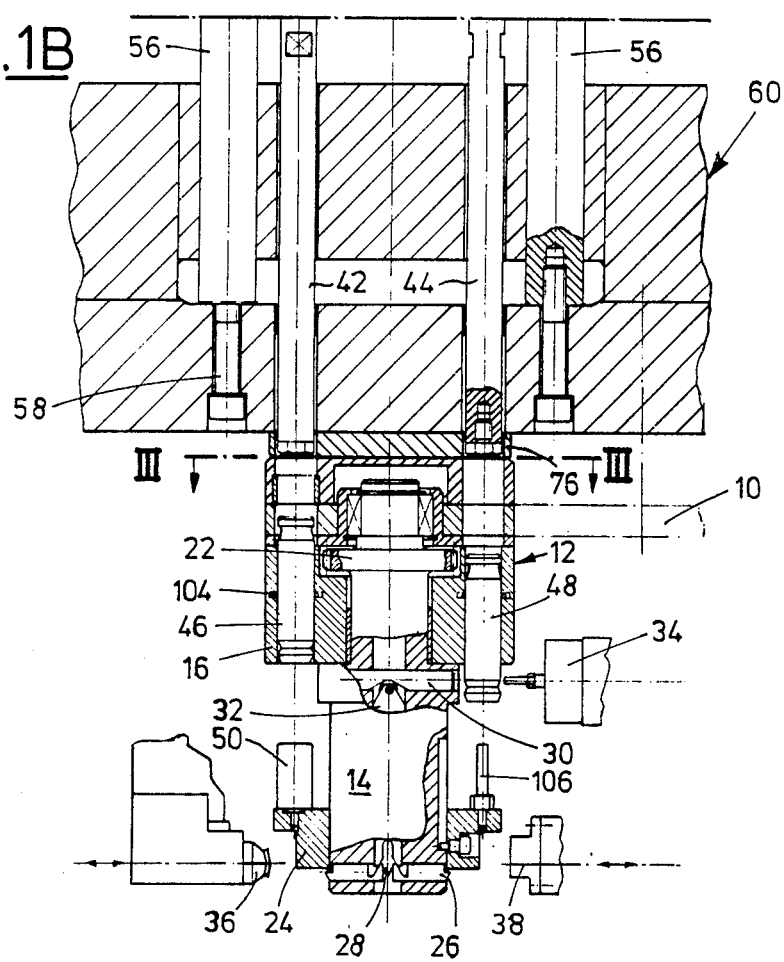

The illustrated packeting device features in the case of the example a rotary table 10 which in FIG. 1B is indicated by broken lines and supports on its circumference two packeting heads 12 which are offset by 180° and moved by alternate index motions of 180° into the packet pickup position shown in Figs. 1A and 1B and into a not illustrated packet delivery position. Each packeting head 12 has a receiving arbor 14 for receiving a lamination packet to be lifted from a lamination stack. This receiving arbor 14 is mounted in a fashion so as to be rotatable, about a vertical center axis, in a guide component 16 which is fixedly connected with the rotary table 10, so that the arbor 14 can be rotated stepwise through 180° by a drive motor installed on the rotary table 10, by way of a shaft 18 and a gear pair 20, 22 shown in FIG. 3.

Installed on the receiving arbor 14, axially movable but nonrotatable relative to it, is a clamping plate 24. Additionally provided on the bottom end of the receiving arbor 14 are radially arranged catches 26 which are radially outwardly advanced by a spring 28, beyond the outer circumference of the receiving arbor 14 so that in this advanced position they will retain the laminations on the arbor and prevent them from sliding down. When laminations with a center bore, which fits the receiving arbor 14, are threaded from below onto the arbor, the catches 26 are elastically forced back radially inwardly. To permit laminations retained on the arbor to slide off again, radially and axially arranged plungers 30, 32 which are movably installed inside the arbor, can be actuated by a cylinder/piston unit 34 which is mounted beside the packeting head 12 on the machine frame 60. Plungers 30, 32 act by way of wedge type surfaces on the catches 26, causing them to be retracted radially inwardly against the force of the spring 28.

Additionally located beside the receiving arbor 14, on diametrically opposed sides, are a cutoff knife 36 such as described in detail, e.g., in the German patent disclosure 20 19 924 and a lateral support 38 on which the laminations bear under the effect of the blade 36 that pushes sidewardly on them.

Figure 3:
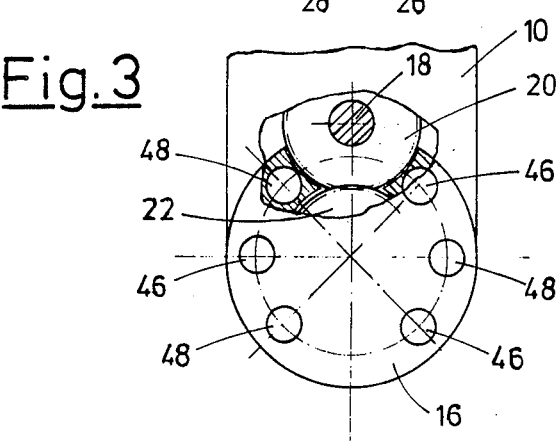
FIG. 3 is a sectional view along line III—III in FIG. 1B.

The top surface of the packeting head 12 which can be rotated along with the rotary table 10 is located at the position of the sectional plane III—III in FIG. 1B. In the illustrated position for pickup of a lamination packet, the packeting head is in axial alignment with an adjustment device 40, shown in the upper part of FIG. 1A and 1B, for the stops that limit the upward travel of the clamping plate 24. Two separate stops 42 and 44 are required to support the clamping plate 24 in two different positions such as needed for measuring off one-half and a full lamination packet. In the disclosed embodiment, each stop 42, 44 has the shape of a group of three stop rods which are arranged on a circular periphery. Corresponding to the arrangement of the stop rods 42 and 44, in the guide component 16 of the packeting head 12, is the arrangement of two groups of intermediate bolts 46 and 48. As shown in FIG. 3, each stop rod 42 or each intermediate bolt 46 aligned with it is diametrically respectively opposed by a stop rod 44 or by an intermediate bolt 48 axially aligned with it. For each group of stop rods 42 and 44, the angular spacing between two of the rods amounts to 90° and the angular spacing between the two further rods amounts to 135° while in the center of the 90° spacing of the stop rods of one group there is arranged a stop rod of the other group. This distribution of stop rods 42, 44 and intermediate bolts 46, 48 makes it possible for three bolt-shaped projections 50 on the top side of the clamping plate 24, which projections have the same circular arrangement as one of the three-unit groups of stop rods 42 or 44 or of the intermediate bolts 46 or 48. Clamping plate 24 is rotated by 180° along with the receiving arbor 14 to depart from the alignment with the stop rods 42 and intermediate bolts 46 and align with the stop rods 44 and the intermediate bolts 48.

The upper ends of the stop rods 42 are mounted on a carriage 52 while the upper ends of the stop rods 44 are fixed on a carriage 54. The carriages 52 and 54 are axially movable and are installed on several vertically arranged guide columns 56. These columns are attached with their bottom ends to the machine frame 60, by means of mounting screws 58, and are connected on their top end with a tie bar 62. Above the carriages 52 and 54, a main carriage 64 is axially movable on the guide columns 56 and is connected with the two carriages 52 and 54 by way of an adjustment spindle 66. The latter spindle has two separate threaded sections 68 and 70 of which one, in the case of the embodiment, the threaded section 68 has a pitch twice as large as that of the other threaded section. As a result, when turning the adjustment spindle 66 by a specific angle, the carriage 52, which through a stationary threaded bushing 72 is in mesh with a threaded section 68, travels an adjustment distance twice as long as that of the carriage 54, which through a stationary threaded bushing 74 meshes with the other threaded section.

FIG. 1B shows the bottom ends of the stop rods 42 and 44 at the same axial height, just above the top surface of the packeting head 12, so that in this upwardly retracted position they will not interfere with the rotation of the rotary table 10 with the two packeting heads 12. Screwed to the machine frame, for better dimensional adaptation between rotary table 10 and machine frame 60, is a flange plate 76 which is easily adaptable in its thickness and provided with a bottom edge just above the top surface of the packeting head 12. The bottom ends of stop rods 42 and 44 assume the position shown in FIG. 1B only in the temporarily adjusted starting position, when the machine is set up, which corresponds to a packet height of zero of the lamination packets to be picked up.

Figure 4:
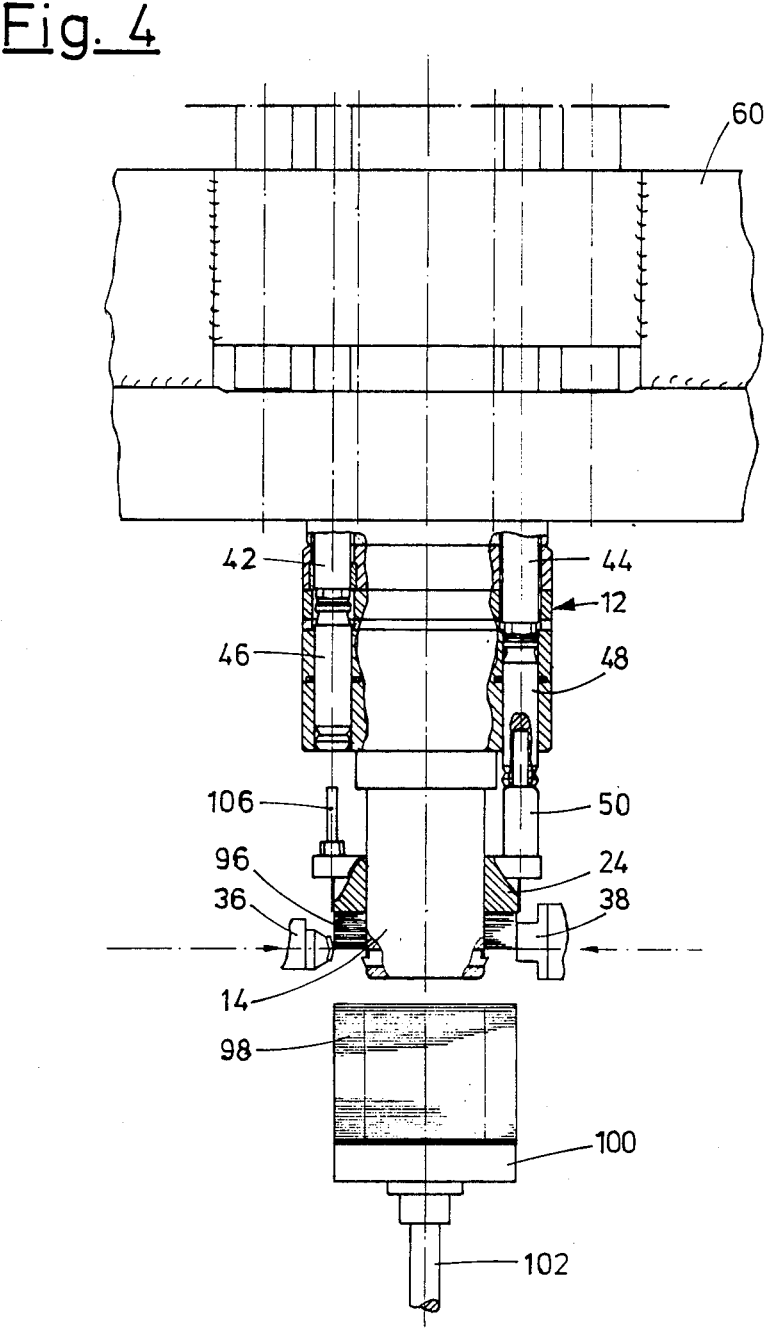
FIG. 4 is a view according to 1B showing the packeting device in a position after measuring off the first half of the lamination packet.
Figure 5:
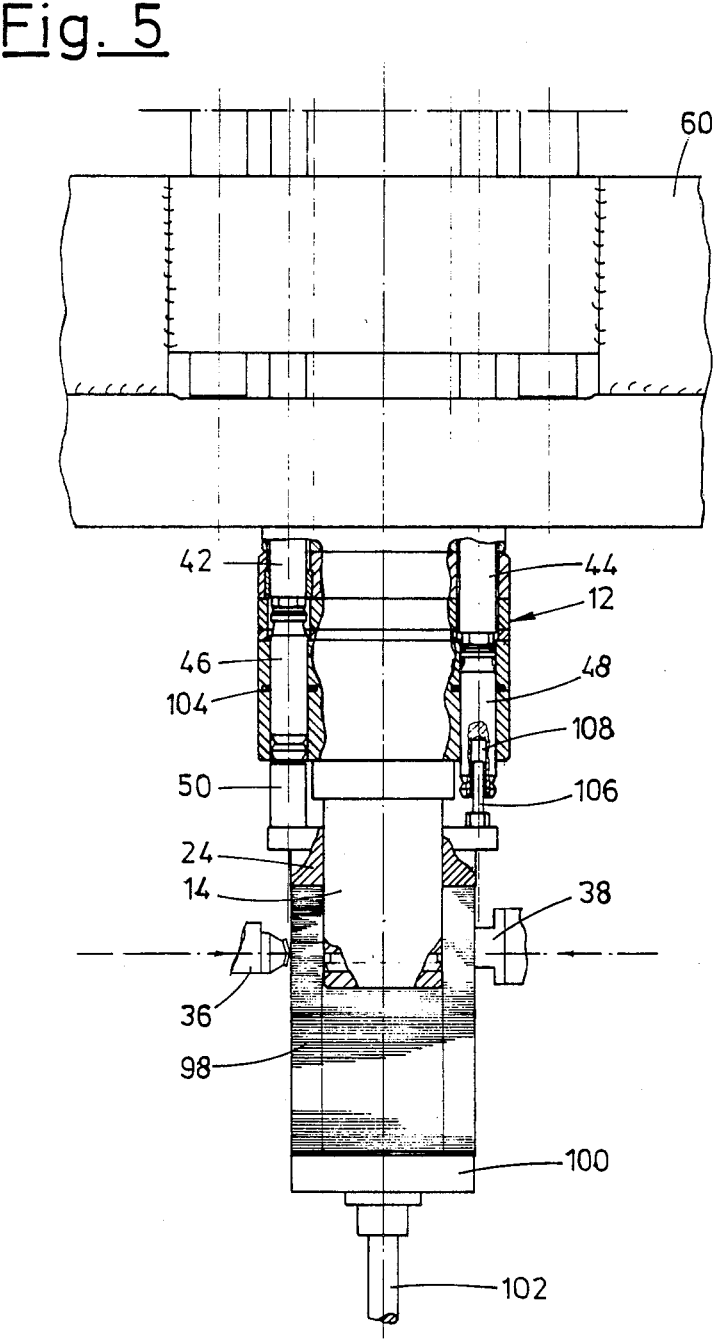
FIG. 5 is a view of the packeting device corresponding to FIG. 4, in a position in measuring off the entire height of the lamination packet. Corresponding reference characters indicate corresponding parts throughout the several views of the drawings.

The stop rods 42, 44 can be retracted also for this extreme case beyond the top surface of the packeting head 12 that is movable with the rotary table 10. On the other hand, the bottom ends of the stop rods 42, 44, at a theoretical packet height of zero, reach their lowest position and support the clamping plate 24 at its lowest level as illustrated in FIG. 1B. When based on this level or the common level shown in FIG. 1B, the adjustment spindle 66 is rotated while it is axially retained by the main carriage 64, the stop rods 42 are upwardly adjusted twice as far as the stop rods 44, due to the fact that the thread pitches of the threaded sections 68 and 70 differ by a factor of two, so that a difference in levels is brought about between the bottom ends of the stop rods 42 and 44 as illustrated in FIG. 4 and 5. The stop rods 42, which are retracted upwardly to the higher level, then form a support for the clamping plate 24 in measuring off a full packet height, whereas the stop rods 44, which through the threaded section 70 of the adjustment spindle 66 have been upwardly retracted only half as far from the position shown in FIG. 1B, support the clamping plate 24 in measuring off one-half packet height.

The adjustment spindle 66 is rotatable at its top end but is axially fixed on the main carriage 64. It is driven by a motor 78 which is also mounted on the main carriage 64 and is provided with a worm drive, through a toothed belt drive 80. The motor 78 is controlled by means of a signal generator 82 that is provided with sensors to determine the angular position of the adjustment spindle 66 and mounted as well on the main carriage 64.

To move the stop rods 42, 44 from the retracted position according to FIG. 1B into the downwardly advanced position shown in FIGS. 4 and 5 for supporting the clamping plate 24, the main carriage 64 is moved downward by a cylinder/piston unit 84 along the guide columns 56, by means of an articulated lever 86, and entrains by way of the adjustment spindle 66 the carriages 52 and 54 with the stop rods 42 and 44 attached to them. In the exemplary case, the cylinder/piston unit 84 which is hinged at its top end is for that purpose shortened to an extent such that the two levers forming the articulated lever drive 86 move through dead center in their extended position until the bottom lever makes contact with an adjustable stop screw 88. The shape of the levers and the mutual arrangement of the pivotal points with regard to the hinged mounting of the cylinder/piston unit 84 is so selected that these will bring about the lever travel through the extended position in both directions. On the other hand, the articulated lever drive 86 which bears on the top screw 88, i.e., being somewhat beyond its extended position, offers a dependable support for the axial forces which need to be absorbed by the stop rods 42 and 44.

Arranged on the tie bar 62, by means of a support bar 90 attached to it, may be an upper and a lower inductive transmitter 92 and 94 serving as sensors for determining whether the main carriage 64 has assumed its retracted, upper position or the downwardly advanced position that is required for supporting the clamping plate 24.

FIGS. 4 and 5 show the device in the packeting operation. In the position according to FIG. 4, one half 96 of a lamination packet has just been separated from a stack 98 while it was compressed between the clamping plate 24 and a lower clamping plate 100 by a cylinder/piston unit 102 acting on them. The upper clamping plate 24 bears, by way of the three bolt type projections 50 that are provided on its top side, on the three intermediate bolts 48 and these, in turn, on the stop rods 44 that are in alignment with them, while the latter bear, via the carriage 54 and the adjustment spindle 66, on the main carriage 64 and the latter, finally, by way of the articulated lever drive 86, bearing on the stop screw 88 on the tie bar 62, which through the guide columns 56 is firmly connected with the machine frame.

After measuring off the first half 96 of a lamination packet in the condition of the stack 98 which is compressed between the clamping plates 24 and 100, by means of the blade 36, the bottom clamping plate 100 is lowered again as shown in FIG. 4, followed then, after radial outward retraction of the blade 36—the half lamination package 96 now being held by the catches 26—by a rotation through 180° of the receiving arbor 14 along with one-half lamination package 96 and the clamping plate 24. Next, the bottom clamping plate 100 moves upward again into the position according to FIG. 5. The lamination stack 98, along with the one-half lamination package 96 which has been rotated by 180°, is now compressed again while the upper clamping plate 24 bears with its bolt-shaped projections 50 on the intermediate bolts 46 and stop rods 42 aligned with them. Due to the axial adjustment of the stop rods 42, the upper clamping plate 24 is in this compressed condition as shown in FIG. 5 located above the blade 36 at the distance of one packet height. Thus, the blade 36 which pushes sidewardly on the lamination stack 98 measures off one full packet height and moves the lamination packet picked up at the upper end of the lamination stack 98, after lowering of the bottom clamping plate 100, through rotation of the rotary table 10 to a delivery station, and from there on in known fashion, e.g., through a transfer station to an insulating apparatus where insulating sleeves are inserted in the slots of the stator lamination packet.

The packeting apparatus described above offers the advantage that the position of the bottom ends of the stop rods 42 and 44 can be changed at any time during the operating cycle, by means of the motor 78 and its associated drive belt 80, as long as the stop rods are not being stressed by the lower clamping plate 100. It is thus possible, for instance during lowering of the bottom clamping plate 100 after measuring off a lamination packet, to change the position of the stop rods 42, 44 in order to pick up from the stack 98 a lamination packet with a different number of laminations. Thus, at substantially the same rate as in the manufacture of lamination packets of constant height, several lamination packets of different heights can alternately be manufactured and fed to different insulating apparatuses wherein insulating sleeves of different lengths will be inserted in the stator slots. Additionally, the packet height can be adjusted without interruption of the production cycle and without correction of the dividing plane of the blade, when a measuring device indicates that the height of several packets successively exceeds or falls short of a specific limit value.

The intermediate bolts 46 and 48 described above and shown in the drawings are not absolutely necessary for the operation of the device. The stop rods 42 and 44 could also be extended by the length of the intermediate bolts 46, 48. However this would require also generating a corresponding longer stroke through the cylinder/piston unit 84 and the articulated lever drive 86 or another suitable drive, in order to retract the bottom ends of the stop rods 42, 44 from the lower position in support of the clamping plate 24 up into the position above the top edge of the packeting head 12 as shown in FIG. 1B. The intermediate bolts 46, 48 thus offer the advantage that the stop rods 42, 44 need to perform only a relatively short stroke for retracting out of the packeting head 12, so that the packeting head can be rotated by the rotary table 10 from the illustrated packet pickup station to the delivery station. In the illustrated embodiment, the intermediate bolts 46, 48 are installed so as to basically be axially freely movable in fitting bores of the packeting head 12. They are held there by spring washers 104 which slidably bear on their circumference until they are moved by an external axial force. Provided on the two ends of the intermediate bolts 46, 48 are two annular grooves with a side wall slanting toward the bolt center. Since the spring washers 104 engage these grooves when the intermediate bolts 46, 48 have been moved sufficiently up or down, they are secured against slipping out of the bores accommodating them.

The three bolt-shaped projections 50 on the clamping plate 24, in plan view, have the same circular configuration as the intermediate bolts 46 according to FIG. 3. Moreover, between the bolt-shaped projections 50 that are provided also on the top side of the clamping plate 24 there are arranged three pins 106 with a smaller diameter, and at that, in the same arrangement as the intermediate bolts 48 according to FIG. 3. Matching these pins 106 are bores 108 in the bottom ends of the intermediate bolts 48. The intermediate bolts 46 do not have such bores. Having the same height as the bolt-shaped projections 50, the pins 106 permit picking up a relatively tall lamination packet immediately after the preceding pickup of a relatively short lamination packet. In the relative angular position according to FIG. 4, the intermediate bolts 46 will, upon measuring off one-half packet height, be pushed back upwardly by the pins 106 at least just as far as the intermediate bolts 48 by the bolt-shaped projections 50, so that the latter will, in the following rotation of the receiving arbor 40 by 180°, not collide with the intermediate bolts 46, which from the previous cycle still remain moved far down. In the relative angular position according to FIG. 5, when measuring off the full packet height, the pins 106, now in alignment with the intermediate bolts 48, will not interfere since they can enter the bores 108.

It goes without saying that the details described above can be modified in their design in many ways. For instance, the illustrated drives can be readily replaced by others that perform the same function. Instead of the common drive for the adjustment of the stop rods 42 and 44 it would be possible to use also two separate drives that are linked by control facilities. Normally, there is not only a single lamination stack present but a magazine with several lamination stacks which are arranged, e.g., on an indexing rotary table and successively moved beneath the receiving arbor 14. Finally, the groups of stop rods 42 or 44 and intermediate bolts 46 or 48 could feature also an arbitrary other number of rods or bolts, in the extreme case only a single stop rod 42 or 44 and a single intermediate bolt 46 or 48, provided that the prerequisite is met that one or several projections 50 on the clamping plate 24 will in their two angular positions, offset by 180°, be in alignment with the stop rods and intermediate bolts of one of the two groups.

While this invention has been described as having a preferred embodiment, it will be understood that it is capable of further modification. This application is therefore intended to cover any variations, uses or adaptations of the invention following the general principles thereof, and including such departures from the present disclosure as come within known or customary practice in the art to which this invention pertains and fall within the limits of the appended claims.

What is claimed is:

1. A method for the pickup of packets with a varying number of stamped laminations, for instance for stators or rotors of electrical machines, from a lamination stack which is compressed between a plurality of clamping plates said method comprising:
   splitting a first half of a packet of laminations along a first plane determined by a first axially adjustable stop of one of said clamping plates and an axial position of a blade that can be forced against a side of said stack, rotating said first half of the packet of laminations by 18020 ̊, reuniting said first half of the packet of laminations with said stack, and splitting an entire packet of laminations along a second plane determined by a second axially adjustable stop of said one clamping plate and the axial position of the blade, said packet of laminations is comprised of a varying number of laminations selected from a stack of laminations which is compressed between said plurality of clamping plates, said stack, while compressed being supported, together with one said clamping plate, on said axially adjustable stops.

2. A method according to claim 1, characterized in that the adjustment of a specific packet height is made during the operating cycle for pickup of the packet.

3. A method according to claim 1 for use with a subsequent method for insertion of insulating sleeves in slots of the lamination packets, characterized in that packets with two different heights are alternately picked up from said stack and fed in a linked operation to two different insulating stations in which the slots of the lamination packets of a specific height are lined with insulating sleeves.

4. A device for picking up packets of stator or rotor laminations comprising a pair of clamping plates that are axially movable relative to each other to compress a stack of laminations, a blade which can be forced against a side of said stack, one said clamping plate being rotatable through 180° with a first half packet of said laminations into two respective angular positions, said clamping plate being axially supported in said two angular positions by two respective axially adjustable stops.

5. A device according to claim 4, characterized in that both said clamping plates are axially movable relative to effective stop surfaces of said stops.

6. A device according to claim 4, characterized in that said stops are simultaneously adjustable by an adjustment drive.

7. A device according to claim 4, characterized in that said adjustment drive includes two threaded sections which each respectively interact with one of said stops said sections having threading pitches with a ratio of 1:2.

8. A device according to claim 4, characterized in that said stops each consist of two groups of three stop rods, said stop rods arranged on a circular periphery, said one clamping plate including three axial projections which align in two respective positions on said circular periphery with one of said respective groups of stops said two respective positions being offset on said periphery by 180°.

9. A device according to claim 4 including a rotary table with a plurality of packeting heads that are movable between a packeting station and a delivery station, each said head comprising a part that is rotationally fixed relative to said rotary table and a part which is rotatable through 180° in said packeting station and which cooperates with said other clamping plate, said other clamping plate being axially movable with respect to said stops, characterized in that the rotationally fixed part of each packeting head includes a plurality of intermediate bolts which are axially movable over a limited axial range and which are axially arranged between and aligned with said projections on the clamping plate and said stop rods.

10. A device according to claim 9, characterized in that the ends of the intermediate bolts facing toward the clamping plate, are provided with axial bores which, in a position of the clamping plate for portioning the entire lamination packet, is aligned with a pin which can be inserted into said bore and which is mounted on said one clamping plate and is approximately equal in length to said projections.

11. A device according to claim 9, characterized in that said intermediate bolts are frictionally held in their axial positions by spring washers that bear on the circumference of said intermediate bolts, said intermediate bolts being axially movable by said stop rods and by said projections and said pin.

12. A device according to claim 9, characterized in that the stop rods can be moved forward, in any of their axial adjustments, from a position retracted with respect to said packeting head into a position wherein they extend into said packeting head.

13. A device according to claim 12, characterized in that the stop rods are axially movable by an articulated lever drive which in an advanced position assumes an above-dead-center position determined by a stop.

14. A device according to claim 9, characterized in that the packeting head, on its end which picks up the laminations, is provided with catches whose actuating drive is arranged sideways beside the packeting head and can be moved up to said packeting head by passing between two intermediate bolts.

15. A device according to claim 4, characterized in that it is linked with several insulating stations or insulating lines to each of which a lamination packet can be conveyed that differs in height from the one preceding it.

* * * * *